United States Patent [19]
Goda

[11] 3,741,444
[45] June 26, 1973

[54] ADJUSTABLE DISPENSING APPARATUS
[76] Inventor: George G. Goda, 390 First Avenue, New York, N.Y.
[22] Filed: June 14, 1971
[21] Appl. No.: 152,636

[52] U.S. Cl.................. 222/309, 222/384, 222/385
[51] Int. Cl............................................. B67d 5/42
[58] Field of Search.................. 222/309, 211, 382, 222/384, 385, 464

[56] References Cited
UNITED STATES PATENTS

| | | | |
|---|---|---|---|
| 2,639,063 | 5/1953 | Yuza | 222/385 |
| 921,594 | 5/1909 | Crane | 222/384 |
| 2,805,001 | 9/1957 | Biederman | 222/211 |
| 3,134,515 | 5/1964 | Callahan, Jr. | 222/211 |
| 2,768,581 | 10/1956 | Langemack | 222/309 X |
| 3,430,813 | 3/1969 | Gilmont | 222/309 X |

Primary Examiner—M. Henson Wood, Jr.
Assistant Examiner—Michael Mar
Attorney—Martin Novack

[57] ABSTRACT

An apparatus for repetitively dispensing predetermined amounts of liquid from a dispensing bottle. An output tube for remote dispensing is provided with a check valve at its end to assure consistent accuracy. In a preferred embodiment, a volume spacer is provided so that the amount to be dispensed can be adjusted without relying on the human eye to effect adjustment.

7 Claims, 2 Drawing Figures

PATENTED JUN 26 1973

3,741,444

INVENTOR.
GEORGE G. GODA

BY M. Novack
ATTORNEY.

ADJUSTABLE DISPENSING APPARATUS

BACKGROUND OF THE INVENTION

This invention relates to liquid dispensing systems and, more particularly, to an adjustable apparatus for repetitively dispensing predetermined amounts of liquid from a dispensing bottle.

The subject matter of the present invention is related to subject matter disclosed in the copending U.S. Patent Applications of G. Goda entitled Liquid Dispensing Apparatus, Ser. No. 152,637, and Liquid Check Valve Assembly, Ser. No. 152,635, both filed of even date herewith.

In a laboratory or production facility there is often a need for repetitively dispensing accurately controlled amounts of liquid, with the precise amount needed differing from time to time. There are available a number if dispensing systems which accomplish these results with varying degrees of success. Many of these systems, notwithstanding their great expense and complexity, suffer such disadvantages as inconvenient use mode, unreliable accuracy, or difficulty of adjustment.

As an example, a conventional pump-type bottle dispenser is typically provided with a short discharge nozzle to which receiving test tubes or receptacles must be brought, often at some inconvenience. Of course, a flexible extension tube can be coupled to the discharge nozzle for remote dispensing, but this gives rise to another problem; i.e., decreased accuracy. Specifically, the presence of air at the uncontrolled end of a relatively long extension tube can render this technique impractical where high accuracy is important. Evaporation from exposed tubing is a significant factor in this respect.

Another approach is to use a remote syringe device at the end of a flexible tube which leads back to a source bottle. The syringe can be moved from test tube to test tube and must generally be both aimed and plunger-operated with a single hand. The repeated plunger operation with, say, the thumb, is not particularly convenient, and a fatigued thumb can lead to incomplete depression of the plunger and accompanying inaccuracy.

A further problem of adjustable dispensers relates to the adjusting operation itself and to the human element thereof. Typically, the adjustment operation involves a visible scale and the setting of a control element (such as a limit-stop) at a particular division on the scale. The precise setting of the control element is sometimes difficult. More importantly, the setting position is usually determined by the human eye and human dexterity, and the resultant dispenser accuracy is limited by these factors.

Accordingly, it is one of the objects of the present invention to provide a relatively inexpensive adjustable dispensing apparatus which overcomes the aforementioned disadvantages of prior art systems.

SUMMARY OF THE INVENTION

The present invention is directed to an apparatus for accurately dispensing predetermined amounts of liquid from a dispensing bottle. A cap member adapted to cover the mouth of the bottle is provided, the cap having an exit aperture therein. A syringe means is mounted in the cap and one end of an output tube is coupled to the inlet/outlet tip of the syringe. The outlet tube, which is preferably a flexible plastic tube, is adapted to extend out of the bottle through the exit aperture in the cap member. An output check valve means is coupled to the other end of the output tube. During remote dispensing the output check valve assures that the output tube remains filled with liquid so that the amounts repetitively dispensed remain essentially constant.

In a preferred embodiment of the invention an elongated post member is rigidly mounted in the cap member adjacent the plunger of the syringe. An adjustable limit-stop means is mounted on the post member. Also, a volume spacer is provided and adapted to removably fit between the plunger and the limit-stop such that the limit-stop can be accurately adjusted to a predetermined position with respect to the rest position of the plunger.

Further features and advantages of the invention will become more readily apparent from the following detailed description when taken in conjunction with the accompanying drawings.

DESCRIPTION OF THE PREFERRED EMBODIMENT

Figure 1:
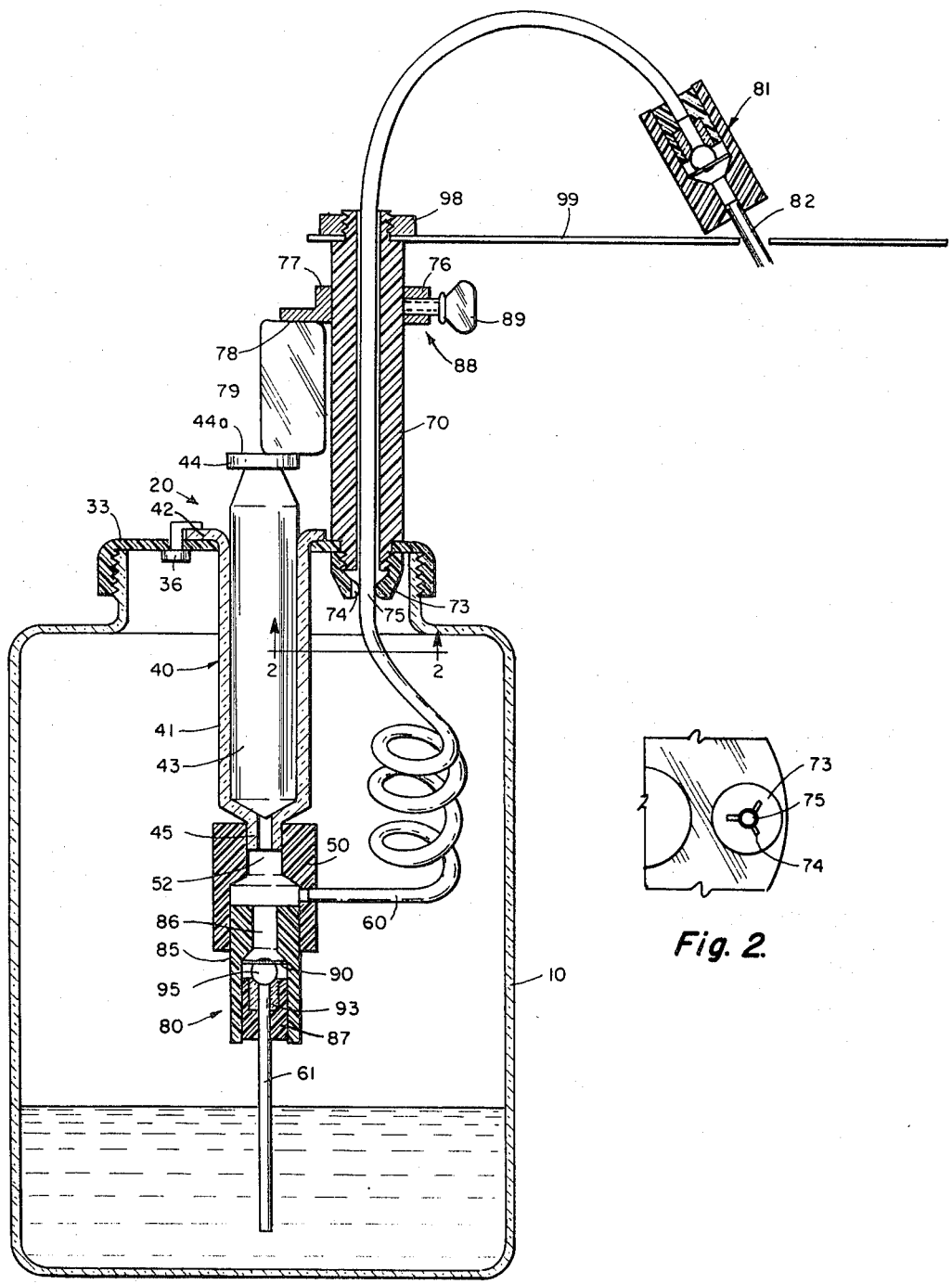
FIG. 1 is a view in section of an adjustable dispensing apparatus in accordance with the invention.

Referring to FIG. 1, a dispensing system 20, which incorporates the novel features of the present invention, is shown as mounted on a bottle 10 which contains a liquid to be dispensed. The dispensing system includes a threaded cap member 33 that is depicted as being screwed on the bottle 10, the mouth of which is also suitably threaded. The cap 33 has a centrally located circular aperture for receiving a syringe 40 that includes a barrel 41. The barrel widens at the top thereof to form an annular flange 42 which rests on the cap 33 and narrows at the bottom thereof to form an inlet/outlet tip 45. A retainer 36 is rotatably mounted in the cap to grasp the flange 42 and hold the syringe 40 firmly in place. Preferably, a second retainer (not shown) is positioned around the periphery of the flange for further support. Within the barrel 41 is a piston 43 which is activated by a plunger 44.

A connecting section 50 couples the tip 45 to both a flexible plastic output tube 60 and to the outlet passage 86 of a valve 80. The section 50 has a cylindrical outer shape and may be constructed of a firm polymer such as the polyfluorocarbon Teflon. The section 50 has a narrow cylindrical mouth 52 which is fitted over and grips the tip 45, and a wider cylindrical mouth proportioned to snugly grasp the outlet end of the valve 80. The central inner portion of the section 50 is tapered and forms a communicating reservoir 51.

A small circular aperture in the side wall of the section 50 is adapted to receive an end of the tube 60 for communication with the reservoir 51. Also, an inlet plastic tube 61 has one of its ends inserted in the inlet end of the check valve 80 and its other end immersed in the liquid to be dispensed.

The check valve 80 illustrated in FIG. 1 is of the type disclosed in the copending Goda Application Ser. No. 152,637, referred to above. As described in that application, the valve 80 includes a main Teflon housing 85 and an inner Teflon housing 87 fitted therein. The inner housing contains a tubular glass piece 93 which acts as a seating surface for a glass ball valve member 95. A thin deformable biasing disc segment 90, preferably a segment of a circular Teflon disc, pushes a glass ball 95 against the seat when the valve is closed.

Figure 2:
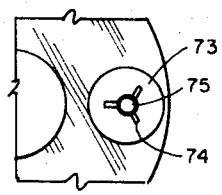
FIG. 2 is bottom perspective view of the wiping element utilized in the apparatus of FIG. 1.

An elongated tubular post member 70 which may be formed of a hard plastic, is rigidly mounted in the cap 33 adjacent the syringe 40. The cap has a second aperture therein and the post narrows to form a shoulder 72 which rests on the cap as the bottom of the post extends through the aperture. The bottom end of the post is threaded and a threaded teflon wiping element secures the post in position. The wiping element, a bottom view of which is illustrated in FIG. 2, is tapered towards its tip. The wiper element has a central cylindrical passage 75 therein and a plurality of slots 74.

The output tube 60 is passed through both the wiping element 73 and the center of the post 70 and is coupled to the output check valve 81. The check valve 81 may be of the same construction as the valve 80 and is provided with a short piece of output tubing 82.

Slidably mounted as a collar on the post member 70 is an adjustable limit-stop 88 which comprises a metal ring 76 having a finger 77 protruding in the direction of the syringe 40. The ring has a threaded aperture which receives the hand screw 89. The bottom surface 78 of the finger is uniformly flat to close tolerance as is the top surface 44A of the syringe plunger 44. A volume spacer block 79, which may be formed of hard plastic, is adapted to rest on the surface 44A and against the post 70.

The operation of the dispenser of FIG. 1 will generally be initiated by setting the piston stroke to yield a desired volume of discharge. A variety of precalibrated volume spacers would typically accompany the apparatus and the appropriate spacer block 79 is chosen and positioned as shown in FIG. 1. The limit-stop is then lowered to a position resting on the spacer block and set using the hand screw. The spacer block is then removed, and, after priming with a few piston strokes, the apparatus is ready for use.

With the apparatus primed and the plunger in a fully depressed position (FIG. 1), the reservoir 51 and tube 60 are filled with liquid. When the plunger is raised, the pressure differential in the barrel 41 acts to open the valve 80 and liquid in the bottle is forced up through the tube 61. The disc segment 90 deforms slightly and the ball 95 is drawn away from the valve seat so that liquid can pass through the openings in the discs 90. During this operation, the liquid in the tube 60 is undisturbed because the presence differential which opens the valve 80 also causes the ball in the oppositely-oriented valve 81 to close more tightly.

When the plunger 44 is depressed, the resultant pressure on the liquid in the reservoir 52 acts to open the valve 81 and to keep the valve 80 closed. In the period between plunger strokes, the liquid in tube 60 cannot drip substantially, nor can air back into the tube due to the action of the biasing disc segment in valve 81 which effectively keeps this valve closed.

As is illustrated in FIG. 1, a substantial amount of extra tubing 60 can be conveniently contained within the bottle when dispensing at locations close to the bottle. The tubing can be readily pulled from or pushed into the bottle to suit convenience, and the wiping action of element 73 assures cleanliness of the external portion of tubing. The passage in post 70 has sufficient clearance for the tubing to pass freely, and the wiping tip 75 applies a light pressure to the tubing. A nut 98 is utilized to secure a plastic rest arm 99 to the top of the post.

I claim:

1. Apparatus for accurately dispensing predetermined amounts of liquid from a dispensing bottle comprising:
   a. a cap member adapted to cover the mouth of said bottle, said cap having an exit aperture therein;
   b. syringe means mounted in said cap and including a plunger which extends slidably upward from said cap;
   c. an output tube having one end coupled to the inlet/outlet tip of said syringe means and adapted to extend out of said bottle through the exit aperture in said cap member;
   d. output check valve means coupled to the other end of said output tube;
   e. an elongated post member rigidly mounted in said cap adjacent said plunger and extending upwardly from said cap;
   f. adjustable limit-stop means mounted on said post member; and
   g. a volume spacer adapted to removably fit between said plunger and said limit-stop such that said limit-stop can be accurately adjusted to a predetermined position with respect to the rest position of said plunger.

2. Apparatus as defined by claim 1 further comprising input check valve means also coupled to the inlet/outlet tip of said syringe means and adapted for positioning within said bottle.

3. Apparatus as defined by claim 1 wherein said post member is tubular and said output tube extends out of said bottle through said post member.

4. Apparatus as defined by claim 3 further comprising a wiping element attached to said post member.

5. Apparatus as defined by claim 4 wherein a substantial amount of extra tubing length is contained within said bottle.

6. In an apparatus for accurately dispensing predetermined amounts of liquid from a dispensing bottle which includes a cap member adapted to cover the mouth of said bottle and syringe means mounted in said cap member, said syringe means having a plunger which extends slidably upward from said cap member, the improvement which comprises:
   a. an elongated post member rigidly mounted in said cap adjacent said plunger and extending upwardly from said cap;
   b. adjustable limit-stop means mounted on said post member; and
   c. a volume spacer adapted to removably fit between said plunger and said limit-stop such that said limit stop can be accurately adjusted to a predetermined position with respect to the rest position of said plunger.

7. Apparatus as defined by claim 6 wherein said post member is tubular and provides an exit means from said bottle through said cap member.

* * * * *